(12) United States Patent
Katagishi (10) Patent No.: US 7,142,780 B2
(45) Date of Patent: Nov. 28, 2006

(54) CAMERA SYSTEM AND LENS BARREL

(75) Inventor: Yuuichi Katagishi, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/859,080

(22) Filed: Jun. 3, 2004

(65) Prior Publication Data

US 2005/0036774 A1 Feb. 17, 2005

Related U.S. Application Data

(63) Continuation-in-part of application No. 10/611,916, filed on Jul. 3, 2003, now abandoned.

(30) Foreign Application Priority Data

Jul. 9, 2002 (JP) ............... 2002-199430
Jun. 11, 2003 (JP) ............... 2003-166394

(51) Int. Cl.
*G03B 13/32* (2006.01)
*G03B 17/00* (2006.01)

(52) U.S. Cl. ............... 396/54; 396/55; 396/103; 396/137; 396/298; 396/419

(58) Field of Classification Search ............ 396/52–55, 396/103, 129, 130, 137, 298, 502, 540, 419, 396/420

See application file for complete search history.

(56) References Cited

U.S. PATENT DOCUMENTS 5,089,841 A 2/1992 Yamada ............... 396/77
5,485,239 A * 1/1996 Ohsawa ............... 396/51
5,815,745 A * 9/1998 Ohsawa ............... 396/76
6,009,278 A * 12/1999 Okano et al. ............... 396/55
6,035,134 A * 3/2000 Sato et al. ............... 396/55
6,567,618 B1 * 5/2003 Kai et al. ............... 396/299

FOREIGN PATENT DOCUMENTS

JP        8-313797        11/1996

* cited by examiner

*Primary Examiner*—W. B. Perkey
(74) *Attorney, Agent, or Firm*—Oliff & Berridge, PLC (57) ABSTRACT

A camera system comprises a camera body; a lens barrel having a photographing optical system, which can be mounted at the camera body; a shutter release switch disposed at the camera body and operated to start a shutter release operation; and a first operating switch related to an operation of the camera system other than the shutter release operation. The first operating switch is disposed at the lens barrel so as to allow an operator to perform a batch operation of the shutter release switch and the first operating switch with the lens barrel mounted at the camera body.

24 Claims, 11 Drawing Sheets

CAMERA SYSTEM AND LENS BARREL

This application is a continuation in part of U.S. application Ser. No. 10/611,916 filed Jul. 3, 2003 now abandoned.

INCORPORATION BY REFERENCE

The disclosures of the following priority applications are herein incorporated by reference:

Japanese Patent Application No. 2002-199430 filed Jul. 9, 2002.

Japanese Patent Application No. 2003-166394 filed Jun. 11, 2003.

BACKGROUND OF THE INVENTION

1. Field of the Invention

The present invention relates to a lens barrel and a camera system that employs the lens barrel.

2. Description of the Related Art

A camera system includes various types of operating switches such as a shutter speed setting dial, an autofocus start button and a focus lock button. As the number of operating switches increases to support multiple functions in the camera system, a problem arises in that the increasingly complicated operations the operator is required to perform to switch the various functions on and off become a hindrance to the full utilization of the functions that camera system offers.

SUMMARY OF THE INVENTION

The present invention is to provide a camera system and a lens barrel allowing an operator to photograph with ease.

A camera system according to the present invention comprises: a camera body; a lens barrel having a photographing optical system, which can be mounted at the camera body; a shutter release switch disposed at the camera body and operated to start a shutter release operation; and a first operating switch related to an operation of the camera system other than the shutter release operation. The first operating switch is disposed at the lens barrel so as to allow an operator to perform a batch operation of the shutter release switch and the first operating switch with the lens barrel mounted at the camera body.

It is preferable that a camera system has at least: a) an autofocus function for achieving a focus state in the photographing optical system, b) a go-home function for storing in memory a focus position of the photographing optical system corresponding to a predetermined photographing distance as a target focus position and adjusting the photographing optical system to the target focus position and c) a vibration correction function for correcting an image blur, and that the first operating switch is used to issue an operational instruction for one of; a) the autofocus function, b) the go-home function and c) the vibration correction function in the camera system.

It is preferable that the lens barrel further comprises a focus ring with which the focus-match state is manually achieved in the photographing optical system and a second operating switch unit disposed in the vicinity of the focus ring; and that the first operating switch is disposed so as to allow the operator to operate the first operating switch with his hand with which the shutter release switch is operated; and the second operating switch unit is disposed so as to allow the operator to operate the second operating switch unit with his hand with which the focus ring is operated. It is preferable that the second operating switch unit is used to issue an operational instruction for one of; a) the autofocus function, b) the go-home function and c) the vibration correction function in the camera system.

A lens barrel that can be mounted at a camera body according to the present invention comprises: a photographing optical system; and a first operating switch with which an operational instruction for the photographing optical system is issued, and wherein the first operating switch is disposed so as to allow an operator to perform a batch operation of a shutter release switch at the camera body and the first operating switch with the lens barrel mounted at the camera body.

It is preferable that the first operating switch is used to issue an operational instruction for at least one of; a) an autofocus function for achieving a focus state in the photographing optical system, b) a go-home function for storing in memory a focus position of the photographing optical system corresponding to a predetermined photographing distance as a target focus position and adjusting the photographing optical system to the target focus position and c) a vibration correction function for correcting an image blur by moving at least one lens constituting part of the photographing optical system along a direction intersecting an optical axis of the photographing optical system. A lens barrel may further comprise: a focus ring with which the focus state is manually achieved in the photographing optical system; and a second operating switch unit disposed in the vicinity of the focus ring. It is preferable that the second operating switch unit is used to issue an operational instruction for at least one of; a) the autofocus function, b) the go-home function and c) the vibration correction function.

It is preferable that the second operating switch unit comprises a plurality of switches arranged along the focus ring, and at least one of the plurality of switches is disposed so as to be operated by the operator who is also operating the focus ring.

The camera system may further comprise a setting selection unit that selects one of; a) the autofocus function, b) the go-home function and c) the vibration correction function in the camera system for which the second operating switch unit issues an operational instruction. The lens barrel may further comprises a setting selection unit that selects one of; a) the autofocus function, b) the go-home function and c) the vibration correction function in a camera system for which the second operating switch unit issues an operational instruction.

DESCRIPTION OF THE PREFERRED EMBODIMENT

The following is an explanation of an embodiment of the present invention, given in reference to the drawings.

Figure 1:
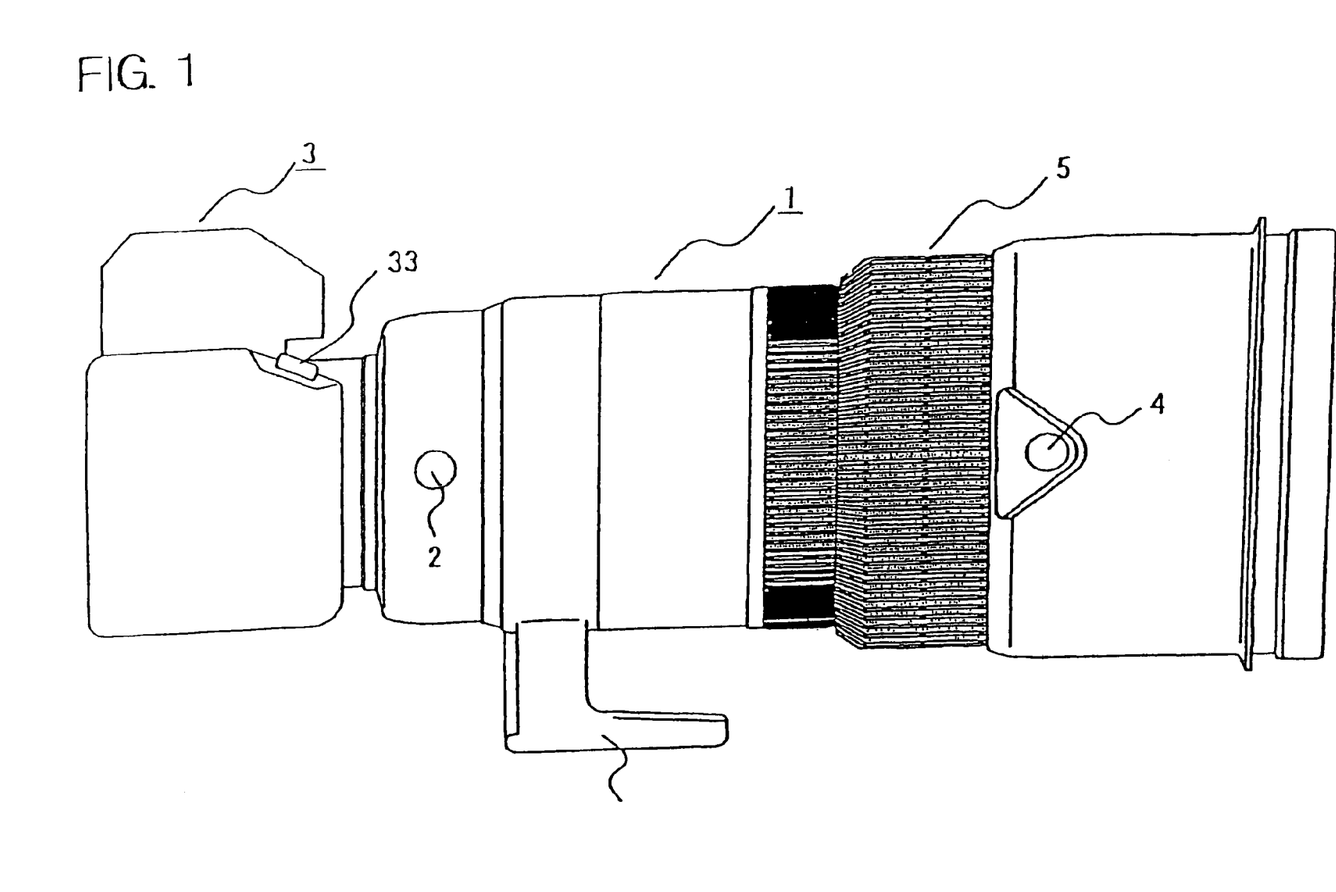
FIG. 1 is a side view of the camera system achieved in an embodiment of the present invention.
Figure 2:
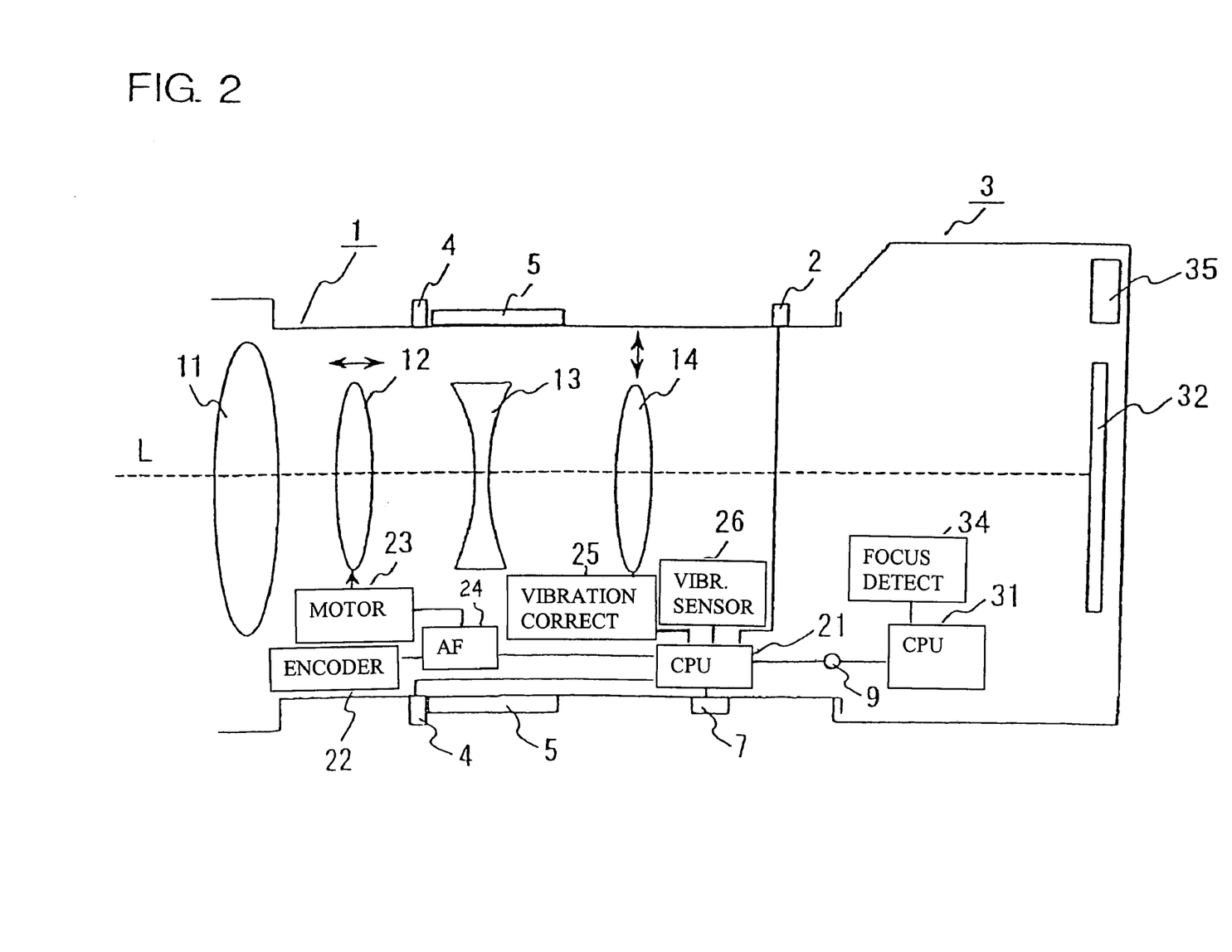
FIG. 2 schematically shows the structure adopted in the camera system in the embodiment.

FIG. 1 is a side view of the camera system achieved in an embodiment of the present invention and FIG. 2 schematically shows the structure adopted in the camera system.

As shown in FIGS. 1 and 2, the camera system includes an interchangeable lens (lens barrel) 1 and a camera body 3. The interchangeable lens 1 includes a first operating switch 2, second operating switches 4, a focus ring 5 with which a manual focusing operation is performed and a tripod mount 6 used to lock the interchangeable lens 1 to a tripod.

The first operating switch 2 is disposed at the interchangeable lens 1 so that it is set in the vicinity of a shutter release switch 33 provided at the camera body 3 when the interchangeable lens 1 is mounted at the camera body 3. Namely, it is disposed so as to allow the operator to operate the shutter release switch 33 and the first operating switch 2 together when the interchangeable lens 1 is mounted at the camera body 3. In this document, such simultaneous operations of the shutter release switch 33 and the first operating switch 2 by the operator is referred to as a batch operation. The first operating switch 2 is a switch operated when using a go-home function which is to be detailed later.

Four second operating switches 4 are provided over approximately 90-degree intervals along the circumferential direction near the focus ring 5. Through the second operating switches 4, an operational instruction for one of the functions available in the camera system, i.e., the go-home function, an autofocus function and a vibration correction function, can be issued. For instance, by operating a second operating switch 4 an instruction to effect a go-home start for go-home control, to start autofocus control, to effect a focus lock in the autofocus control or to start vibration correction control can be issued. The specific operational instruction to be issued through the second operating switches 4 can be selected with a function selector switch 7 shown in FIG. 2.

As shown in FIG. 2, the camera body 3 includes a CPU 31, a CCD 32, a focus detection unit 34 and a viewfinder 35. The CPU 31, which is connected with a CPU 21 at the interchangeable lens 1 via a coupler 9, implements overall control for the camera system including the autofocus control and the vibration correction control. The CCD 32 captures a subject image having passed through a photographing optical system in the interchangeable lens 1. The focus detection unit 34 detects the focus state of the captured image and outputs a focal point detection signal to the CPU 31.

The interchangeable lens 1 includes a first lens group 11, a second lens group 12, a third lens group 13 and a fourth lens group 14. The first lens group 11, the second lens group 12, the third lens group 13 and the fourth lens group 14 together constitute the photographing optical system. The second lens group 12 performs focusing as it moves along an optical axis L. The fourth lens group 14 corrects an image blur caused by hand movements as it moves within a plane perpendicular to the optical axis L.

In addition, the interchangeable lens 1 includes the function selector switch 7, the coupler 9, the CPU 21, a magnetic encoder 22, an ultrasonic motor 23, an autofocus (AF) control unit 24, a vibration correction drive unit 25, a vibration sensor 26 and the like. The function selector switch 7 is used to select a specific function through a second operating switch 4 as described earlier. The coupler 9 electrically connects the CPU 21 at the interchangeable lens 1 with the CPU 31 at the camera body 3. The magnetic encoder 22 detects the position of the second lens group 12. The vibration sensor 26 detects a vibration of the interchangeable lens 1 caused by hand movement, i.e., the displacement of the interchangeable lens 1 relative to an absolute space.

The CPU 21 of the interchangeable lens 1 assigns an operational instruction for the function selected with the function selector switch 7 to the second operating switches 4 in response to a signal provided from the function selector switch 7. An operational instruction signal from the second operating switch 4 and an operational instruction signal from the first operating switch 2 are input to the CPU 21. The CPU 21 executes the autofocus control and the go-home control to be detailed later by controlling the AF control unit 24. The CPU 21 also executes the vibration correction control by controlling the vibration correction drive unit 25 in response to a detection signal provided by the vibration sensor 26.

The AF control unit 24 controls the ultrasonic motor 23 based upon a command issued by the CPU 21. The ultrasonic motor 23 executes focus control by driving the second lens group 12 along the optical axis L in response to a command issued by the AF control unit 24.

The vibration correction drive unit 25 corrects an image blur caused by hand movement by driving the fourth lens group 14 along a direction perpendicular to the optical axis L in response to a command issued by the CPU 21.

Next, the go-home function of the camera system is explained.

The go-home function refers to a function through which the focus position of the photographing optical system corresponding to a given photographing distance is stored in memory in advance as a target focus position and the photographing optical system is adjusted to the target focus position whenever desired. More specifically, the second lens 12 is driven to focus on a subject positioned at a desired photographing distance and this focus state is stored into a memory (not shown) (a focus preset is performed). Then, as a go-home start switch is operated while the focus is adjusted to another subject, the second lens group 12 is driven so as to achieve the stored focus state instantly.

The go-home function can be effectively utilized when photographing, for instance, a sporting event. For instance, the function can be used to advantage when photographing a baseball player running toward the third base for a steal during a baseball game. Since the steal motion occurs rapidly and the player is already running, the autofocus control may not work effectively in the camera system. Accordingly, the focus is preset at third base in advance by using the go-home function. As the photographer photographing the player at bat or the pitcher operates the go-home start switch as soon as he becomes aware of the steal play, the focus is adjusted to the third base instantaneously. Thus, he does not miss photographing the steal play.

Next, an operation executed in the camera system in the embodiment of the present invention is explained. It is assumed that the go-home function has been selected with the function selector switch 7 and the second operating switches 4 have been assigned to function as the go-home start switch for starting the go-home function in the embodiment. In addition, the first operating switch 2 is used to preset the focus for the go-home function. In the following explanation, the procedural steps of the operation performed by the operator using the go-home function are described in correspondence to the operation executed in the camera system.

First, the photographer presses the shutter release switch 33 (see FIG. 1) halfway down with the index finger of his right hand with the focusing zone of the focal adjustment area adjusted to a subject present over a desired photographing distance, e.g., the third base. In response to the halfway press operation of the shutter release switch 33, the CPU 31 at the camera body 3 calculates the defocus quantity based upon a range finding signal provided by the focus-match detection unit 34. The CPU 31 provides a defocus signal corresponding to the defocus quantity thus calculated to the CPU 21 at the interchangeable lens 1. Based upon the defocus signal provided by the CPU 31, the CPU 21 provides a control signal to the AF control unit 24.

Based upon the control signal from the CPU 21, the AF control unit 24 drives the ultrasonic motor 23, thereby executing the focus control by moving the second lens group 12 along the optical axis L. The magnetic encoder 22 detects the position of the second lens group 12 and provides position data indicating the detected position to the CPU 21 via the AF control unit 24.

The focus detection unit 34 checks whether or not the focus control by the AF control unit 24 has been completed. As it is verified the focus state has been achieved, a display is brought up on a liquid crystal display (not shown) inside the viewfinder 35 to indicate that the focus state has been achieved.

When pre-setting the focus for the go-home function, the photographer presses the shutter release switch 33 halfway down and operates the first operating switch 2 with the middle finger of his right hand while focusing on the desired subject. In response to the operation of the first operating switch 2, the position information indicating the position of the second lens group 12 detected by the magnetic encoder 22 is stored into the memory inside the interchangeable lens 1 as a go-home target (a target focus position). The focus preset is thus completed. Once the focus preset is completed, a buzzer (not shown) provided at the interchangeable lens 1 sounds to inform the photographer of the focus preset completion. After the focus preset is completed, the go-home target is maintained even if the operation of the first operating switch 2 stops, until another focus preset operation is performed.

In addition, in response to the halfway press operation of the shutter release switch 33, the CPU 31 at the camera body 3 issues an instruction for the CPU 21 of the interchangeable lens 1 to start the vibration correction control. Upon receiving the instruction for the vibration correction control start, the CPU 21 determines the extent to which the fourth lens group 14 is to be driven based upon vibration information provided by the vibration sensor 26. Then, the CPU 21 outputs the drive quantity calculated for the fourth lens group 14 to the vibration correction drive unit 25. The vibration correction drive unit 25, in turn, drives the fourth lens group 14 so as to achieve the drive quantity indicated by the CPU 21. By moving the fourth lens group 14 within a plane perpendicular to the optical axis L and thus shifting the optical axis L of the photographing optical system, a blurring of the photographic image captured by the CCD 32 is corrected. The vibration correction control is executed each time the shutter release switch 33 is pressed halfway down.

After the autofocus control and the vibration correction control are executed in response to the halfway press operation of the shutter release switch 33, the photographer performs a photographing operation as in the related art by pressing the shutter release switch 33 all the way down.

In order to enter the focus state achieving the preset focus from a state other than the preset focus state, i.e., in order to focus on the subject present at the desired photographing distance, the photographer operates a second operating switch 4 with his left hand while holding the camera body 3 with his right hand. In response to the operation of the second operating switch 4, the CPU 21 determines a control signal based upon the difference between the current position of the second lens group 12 detected by the magnetic encoder 22 and the go-home target stored in memory and provides this control signal to the AF control unit 24. The AF control unit 24 drives the ultrasonic motor 23 based upon the control signal from the CPU 21. As a result, the second lens group 12 is caused to move along the optical axis L and the camera system enters the focus-match state achieving the preset focus. Subsequently, the operator photographs the desired subject by pressing the shutter release switch 33 all the way down.

As described above, the photographer operates the shutter release switch 33 with the index finger of his right hand and operates the first operating switch 2 to perform a focus preset with the middle finger of his right hand. In other words, the photographer is allowed to perform both the shutter release operation and the focus preset operation with his right hand alone. Thus, he can preset the focus with a high degree of reliability at the photographing distance of the target subject without having to move the camera from one hand to the other. It is to be noted that the photographer may first achieve a desired focus state by operating the focus ring 5 with his left hand and then may perform a focus preset by operating the first operating switch 2 with his right hand. In this case, the photographer may start the go-home control by subsequently operating a second operating switch 4 with his left hand, with which he has operated the focus ring 5. The plurality of second operating switches 4 are provided along the focus ring 5. Thus, the photographer is afforded ease of use since he can operate one of the plurality of second operating switches 4 with his left hand, with which he can also operate the focus ring 5.

It is to be noted that since the plurality of second operating switches 4 are provided along the focus ring 5 as described above, the photographer is able to operate one of the second operating switches 4 readily to start using the go-home function regardless of whether he is taking a photograph with a longitudinal composition by holding the camera body 3 in the portrait orientation or he is taking a photograph with a lateral composition by holding the camera body 3 in the landscape orientation.

The first operating switch 2 is disposed at a position near the shutter release switch 33 so as to allow the photographer to operate it in a batch together with the shutter release switch 33. Thus, the photographer can perform a focus preset quickly by operating the first operating switch 2, regardless of whether he is taking a photograph with a longitudinal composition or a lateral composition. It is to be noted that in a camera system having a separate shutter release switch 33 for photographing pictures with a longitudinal composition, another first operating switch 2 may be provided in the vicinity of the shutter release switch 33 for photographing pictures with a longitudinal composition as well. In addition, as long as the first operating switch 2 is provided near the shutter release switch 33 and thus can be operated while operating the shutter release switch 33, the first operating switch 2 may be disposed at the camera body 3 instead.

While an explanation is given above in reference to the embodiment on an example in which the go-home function is selected with the function selector switch 7 and the function of instructing a go-home function start is assigned to the second operating switch 4, the present invention is not limited to this example. For instance, the camera system may be set up so as to start the autofocus control or the vibration correction control by operating a second operating switch 4 instead.

Figure 3:
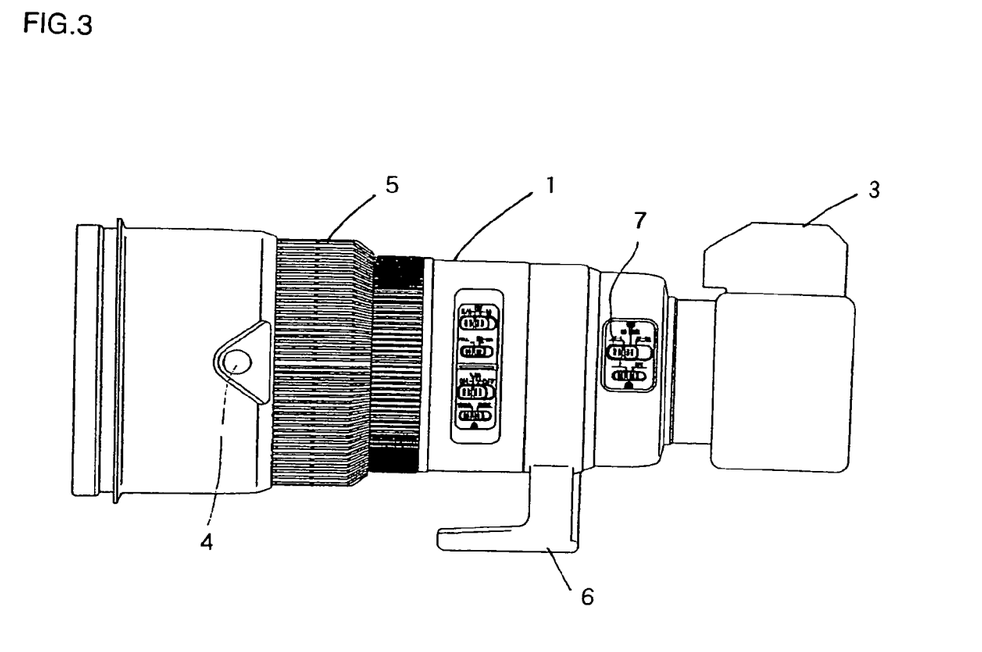
FIG. 3 is a figure showing the other side of the camera system shown in FIG. 1.

Next, explanation is given on the operation of the function selector switch 7 in detail. FIG. 3 is a side view showing the other side of the camera system shown in FIG. 1, that is, the left side of the camera system when the photographer holds the camera system in the landscape orientation. The function selector switch 7 is disposed on the opposite side of the first operating switch 2 relative to the optical axis L of the interchangeable lens 1 as shown in FIG. 3. By disposing the function selector switch 7 at the left of the interchangeable lens 1, the photographer can operate the function selector switch 7 by his left hand with his right hand being able to operate the shutter release switch 33.

Here, an example where one second operating switch 4 is installed at the left of the interchangeable lens 1 as shown in FIG. 3 is explained. The second operating switch 4 is disposed in the vicinity of the focus ring 5 so as to be operated with one of the photographer's hands which also operates the focus ring 5. It is to be noted that even when a plurality of second operating switches 4 are provided along the focus ring 5, they should be arranged so that at least one of the second operating switches 4 can be operated by a photographer's hand that operates the focus ring 5.

Allocation of Focus Lock Function

Figure 4:
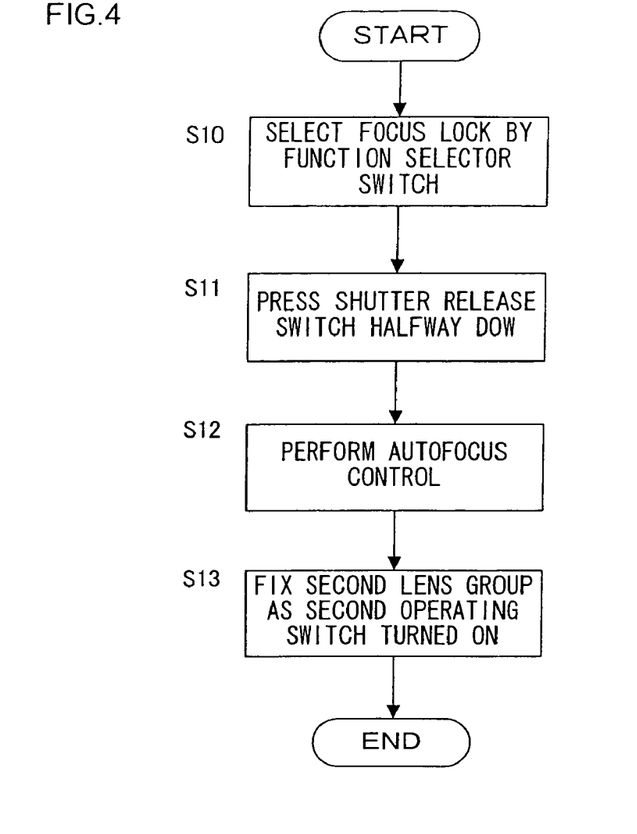
FIG. 4 is a flowchart showing a flow of operations when the focus lock function is allocated in a second operating switch.
Figure 5:
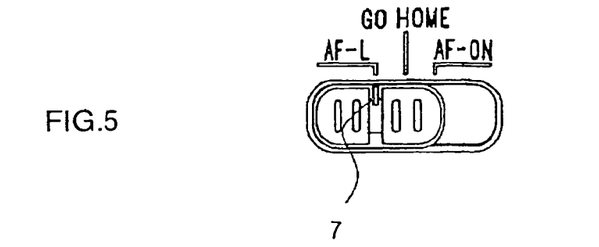
FIG. 5 is a figure showing a function selector switch set to the focus lock position.

In the following, how to operate the camera system when a focus lock function is allocated in the second operating switch 4 by the function selector switch 7 is explained with reference to a flowchart shown in FIG. 4. When the photographer operates the function selector switch 7 to set the function selector switch 7 to a focus lock (AF-L) position as shown in FIG. 5, the focus lock function of the autofocus control is allocated in the second operating switch 4 (step S10).

After the photographer presses the shutter release switch 33 at the camera main body 3 halfway down (step S11), the autofocus control starts operating and the second lens group 12 are moved in the direction of the optical axis L to achieve the focused state (step S12). By turning the second operating switch 4 on in the focused state, the focus lock operation is performed and a position of the second lens group 12 is fixed (step S13). The position of the second lens group 12 is maintained and the camera system keeps focusing on the same position, that is, at the same photographic distance to a subject until the second operating switch 4 is operated again to cancel the focus lock.

Figure 6:
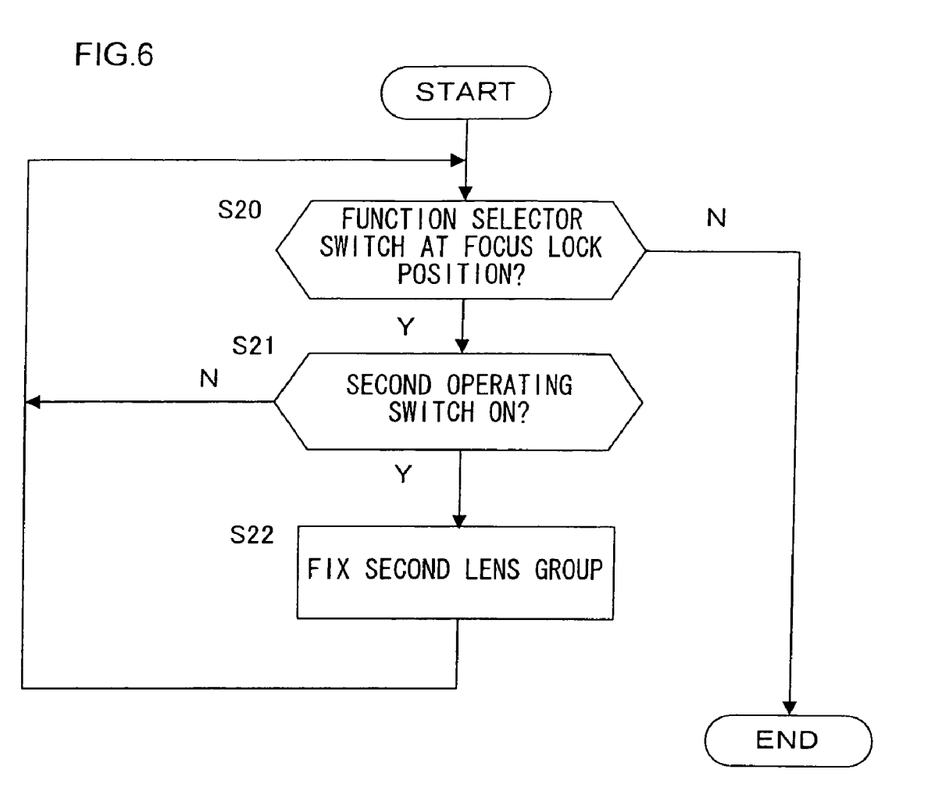
FIG. 6 is a flowchart showing the operational procedure when the focus lock function is allocated in a second operating switch.

FIG. 6 is a flowchart showing the procedure of the focus lock control executed in the CPU 21 when the focus lock function is allocated in the second operating switch 4.

The CPU 21 determines as to whether or not the function selector switch 7 is set to the focus lock position (AF-L) in step S20. Step S21 is proceeded to when the function selector switch 7 is set to the focus lock position, whereas this control is ended when the function selector switch 7 is not set to the focus lock position. In step S21, it is determined as to whether or not the second operating switch 4 has been turned on. If the second operating switch 4 has been turned on, the processing proceeds to step S22 in which a signal is output to the AF control unit 24 to fix the second lens group 12. By doing this, the second lens group 12 is fixed in a focused state set through the autofocus control or operation of the focus ring 5. If, on the other hand, it is determined in step S21 that the second operating switch 4 has not been turned on, the processing returns to step S20.

A single lens reflex camera as shown in FIG. 1 generally utilizes a function that focuses on a still subject and locks the focus state by keeping the shutter release switch 33 pressed halfway down, i.e., so-called single AF, and a function that follows and continues focusing on a moving subject, i.e., so-called continuous AF, as the autofocus function. The focus lock function performed using the second operating switch 4 mentioned above is convenient when especially taking pictures using the continuous AF.

When focusing on a still subject, the single AF mode is selected by operating a switch not shown in the drawings. After placing the subject in a focus detection area (a focus frame) set in a visual field of a viewfinder, the shutter release switch 33 is pressed halfway down. In response to the shutter release switch being pressed halfway down, the autofocus control starts working and the second lens group 12 is moved to the focused position relative to the subject. While the shutter release switch 33 is kept pressed halfway down, the second lens group 12 does not shift even when the composition is changed and the subject comes out of the focus frame so that the focused state to the subject is maintained.

On the other hand, when focusing on a moving subject, the continuous AF mode is selected by the switch operation. After placing the subject in a focus frame set in a visual field of the view finder, the autofocus control starts working by pressing the shutter release switch 33 halfway down. While the shutter release switch 33 is pressed halfway down, the second lens group 12 is moved in accordance with the movement of the subject so as to maintain the focused stated to the subject. However, if the subject comes out of the focus frame and another object comes into the focus frame, the focus is set on the object present in the focus frame and the target subject becomes out of focus. Such a situation is likely to occur especially when the composition for photograph is changed.

By using the focus lock function while the continuous AF mode is set, the photographing can be performed in an efficient manner. In particular, when the second operating switch 4 is pressed while the subject present in the focus frame is in focus, the second lens group 12 becomes fixed. Because the second lens group 12 is fixed, the focused state to the subject is maintained even when the composition is changed and another object comes into the focus frame.

Moreover, by allocating the focus lock function in the second operating switch 4 while the continuous AF mode is selected, the continuous AF mode can be used in a same manner as the single AF mode. Concretely, the photographer places a still subject in a focus frame and presses the shutter release switch 33 halfway down while the continuous AF mode is selected. Accordingly, the autofocus control starts working and the second lens group 12 is moved to the focused position relative to the subject. Even though the continuous AF mode is selected, the second lens group 12 does not move since the subject is stationary.

However, if the composition is changed and the subject comes out of the focus frame, the second lens group 12 moves so as to focus on an object which is newly present in the focus frame and is different from the subject. In order to prevent such a situation from occurring, the second operating switch 4 is to be pressed while the subject is in focus so as to fix a position of the second lens group 12. Thus, even when the composition is changed, the focus is not set on another object which has come into the focus frame, and a focused state to the target subject can be maintained.

In a case where the focus lock function is allocated in the second operating switch 4 by the function selector switch 7, the single AF mode that maintains the focused state to a still subject may be omitted. It is possible that the CPU 21 automatically sets the continuous AF mode when the focus lock function is allocated in the second operating switch 4 by function selector switch 7.

Allocation of Autofocus Start Function

Figure 7:
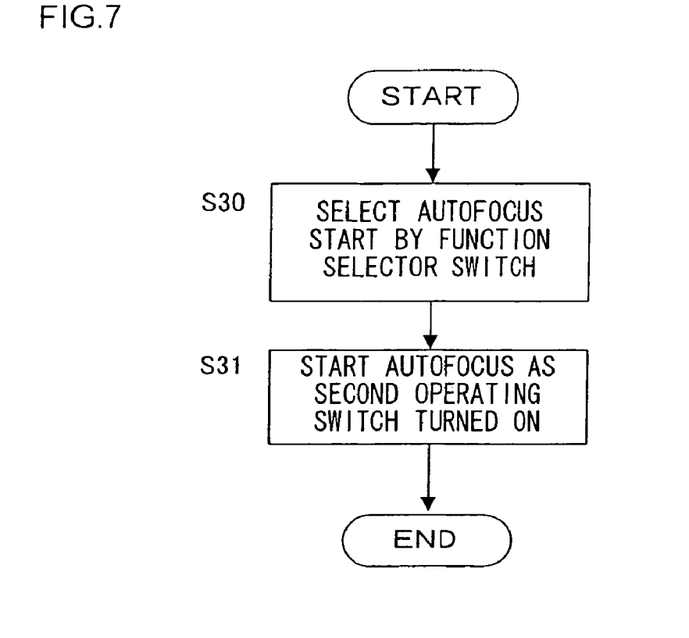
FIG. 7 is a flowchart showing a flow of operations when the start function for the autofocus control is allocated in a second operating switch.
Figure 8:
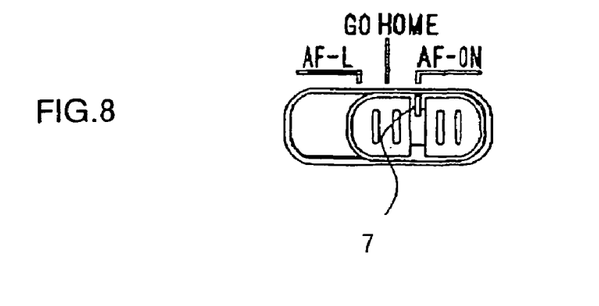
FIG. 8 is a figure showing the function selector switch set to the focus start position.

Next, an explanation is given on a case where the function of issuing the start instruction of the autofocus control is allocated in the second operating switch 4 by the function selector switch 7. How to operate the camera system in this case is explained by using a flowchart shown in FIG. 7. When the photographer operates the function selector switch 7 to set the function selector switch 7 to a focus start (AF-ON) position as shown in FIG. 8, the start function of the autofocus control is allocated in the second operating switch 4 (step S30). The autofocus control begins when the photographer turns the second operating switch 4 on and the second lens group 12 is moved so as to focus on a subject in the focus frame (step S31). By allocating the start function of the autofocus control in the second operating switch 4, the operation which is performed by pressing the shutter release switch 33 halfway down can also be performed when the second operating switch 4 is operated.

Figure 9:
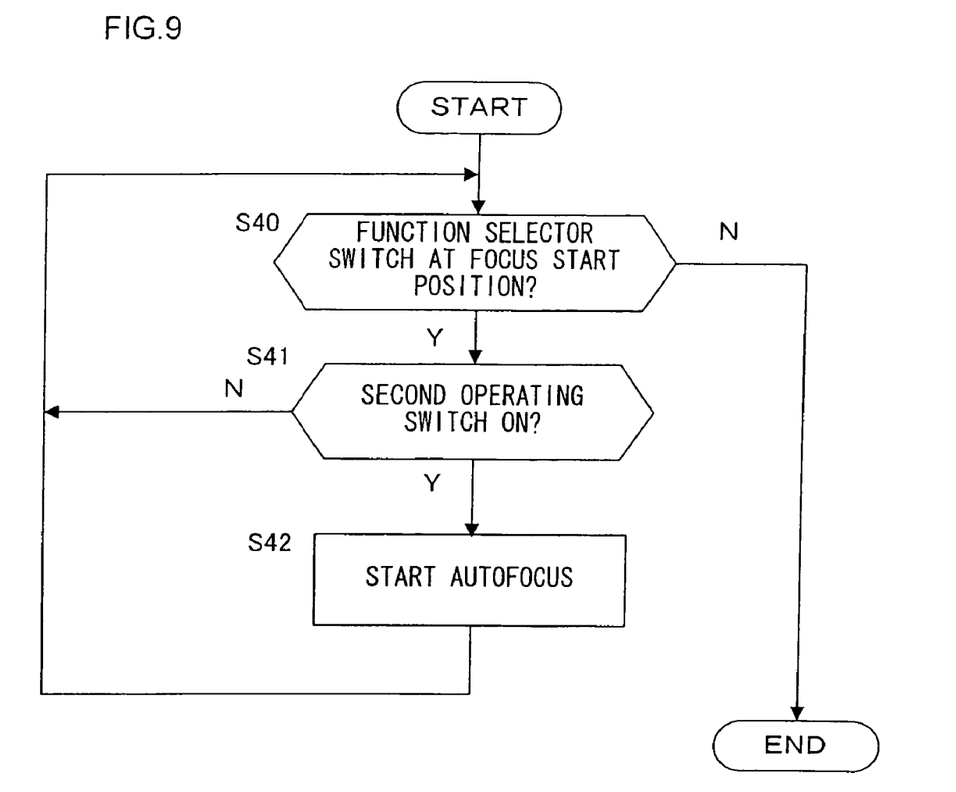
FIG. 9 is a flowchart showing the operational procedure when the autofocus control start function is allocated in the second operation switch.

FIG. 9 is a flowchart showing the procedure of the autofocus control executed in the CPU 21 when the autofocus control start function is allocated in the second operating switch 4.

The CPU 21 determines as to whether or not the function selector switch 7 is set to the focus start position (AF-ON) in step S40. Step S41 is proceeded to if the function selector switch 7 is set to the focus start position, whereas this control is ended if the function selector switch 7 is not set to the focus start position. In step S41, it is determined as to whether or not the second operating switch 4 has been turned on. If the second operating switch 4 has been turned on, the processing proceeds to step S42 in which a signal is output to the AF control unit 24 to move the second lens group 12 to focus on the subject. If, on the other hand, it is determined in step S41 that the second operating switch 4 has not been turned on, the processing returns to step S40.

In a case where the autofocus control begins in response to the shutter release button 33 at the camera main body 3 being pressed halfway down, there is a possibility that the photographer presses the shutter release button 33 all the way down so that a shutter is released by mistake. By allocating the start function of the autofocus control in the second operating switch 4 so that the autofocus control is to begin in response to the operation of the second operating switch 4, the shutter release button 33 can be used as a switch only for the shutter release operation. That is, only one function is allocated to one operating member and thus, the photographer can concentrate on an individual operation.

Allocation of Go-Home Function

Figure 10:
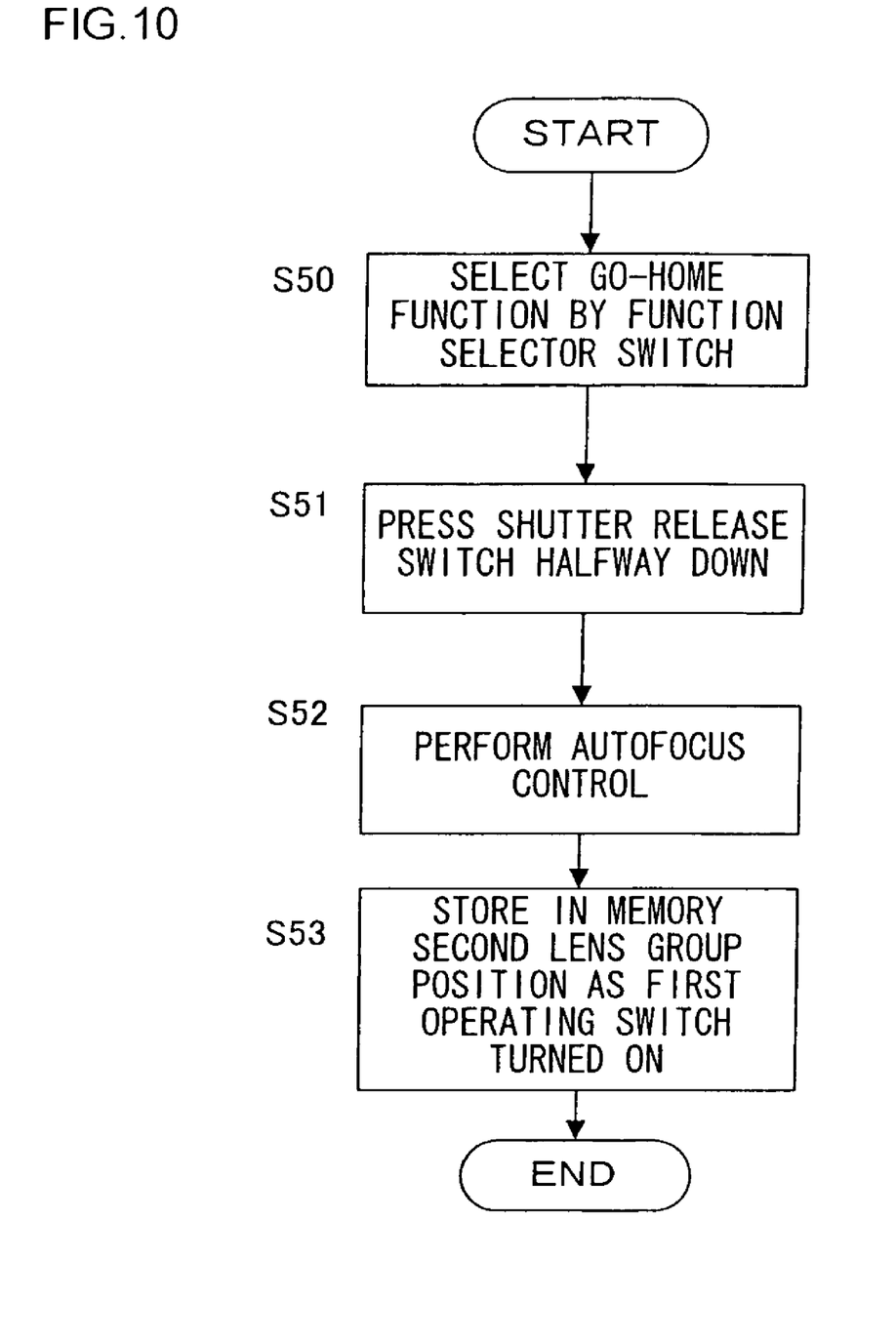
FIG. 10 is a flowchart showing a flow of operations when allocating the go-home function to the second operating switch and performing the focus preset.
Figure 11:
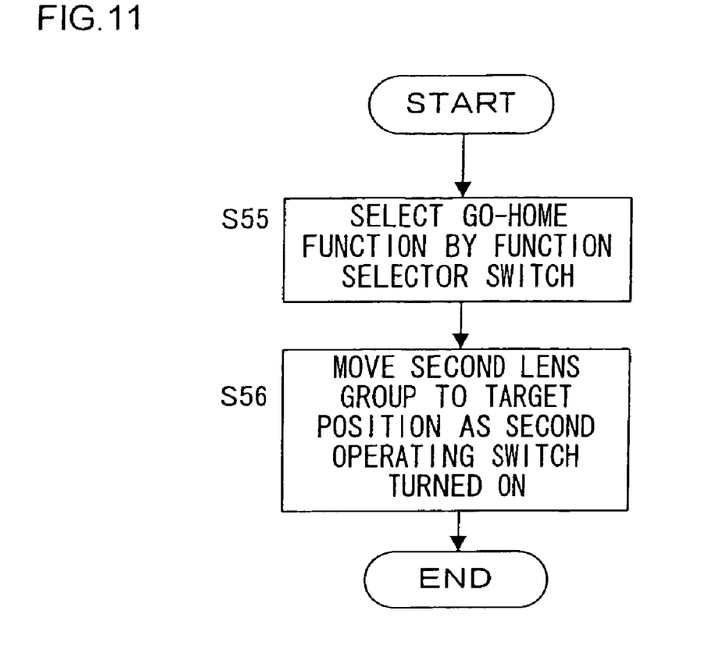
FIG. 11 is a flowchart showing a flow of operations when allocating the go-home function to the second operating switch and performing the go-home operation.

Next, how to operate the camera system when a go-home function is allocated in the second operating switch 4 by the function selector switch 7 is explained with reference to flowcharts shown in FIGS. 10 and 11. FIG. 10 is a flowchart showing the operation procedure of the focus preset of the go-home function, and FIG. 11 is a flowchart showing the procedure when the go-home control is executed.

Figure 12:
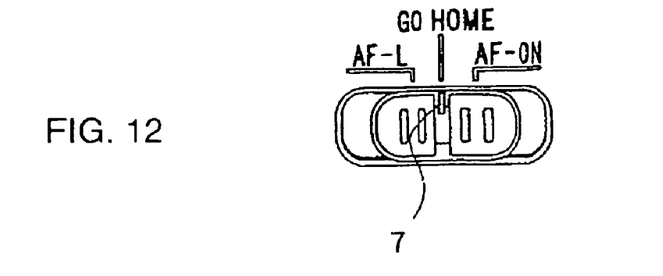
FIG. 12 is a figure showing the function selector switch set to the go-home position.

When the photographer operates the function selector switch 7 to set the function selector switch 7 to a go-home (GO-HOME) position as shown in FIG. 12, the go-home function is allocated in the second operating switch 4 and the focus preset function is allocated in the first operating switch 2 (step S50). The autofocus control begins when the photographer presses the shutter release switch 33 halfway down (step S51), and the second lens group 12 is moved so as to focus on a subject in the focus frame (step S52).

When the first operating switch 2 is pressed in this state, the focus preset is performed by storing in a nonvolatile memory (not shown) a positional information of the second lens group 12 at that time point as a target focus position (step S53). The focus preset can also be performed in a state where the focus ring 5 is operated manually to focus on the subject or in any focused state.

When the photographing is performed using the autofocus or manual focus after storing in memory the target focus position, a position of the second lens group 12 shifts from the target focus position having been focus-preset. Afterwards, when the second operating switch 4 is operated in a state where the function selector switch 7 is set to the go-home position (step S55), the go-home control starts operating so that the second lens group 12 is moved to and fixed at the target focus position having been focus-preset (step S56).

Figure 13:
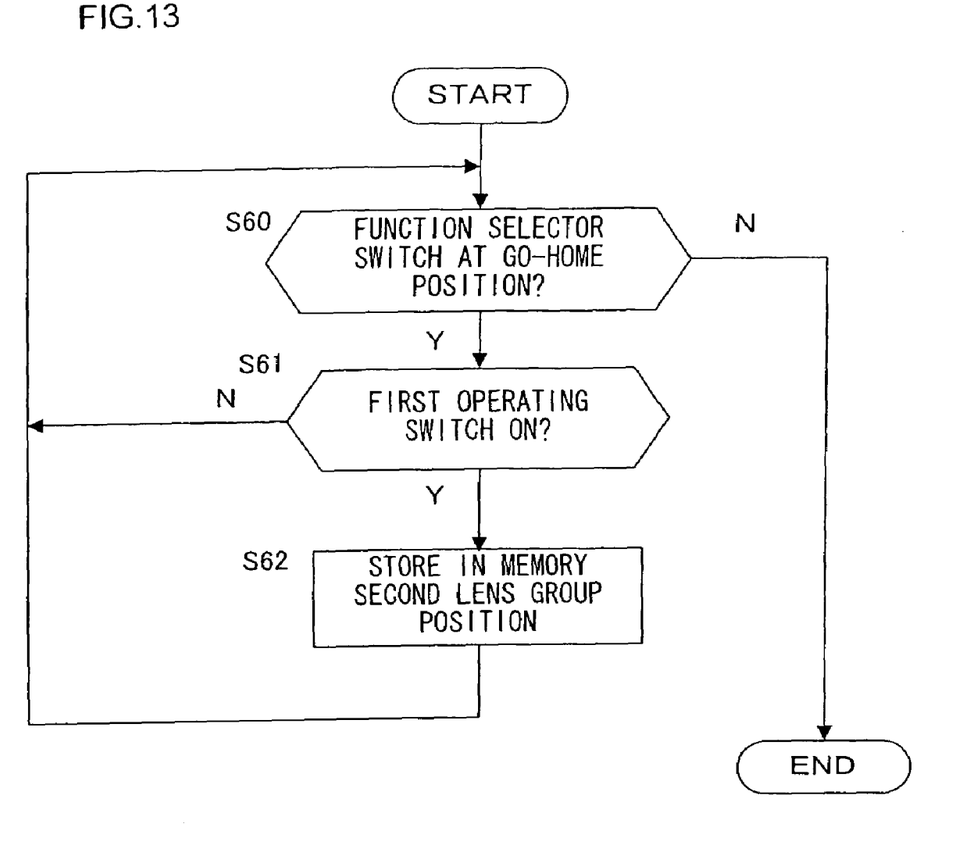
FIG. 13 is a flowchart showing the operational procedure when allocating the go-home function to the second operating switch and performing the focus preset.
Figure 14:
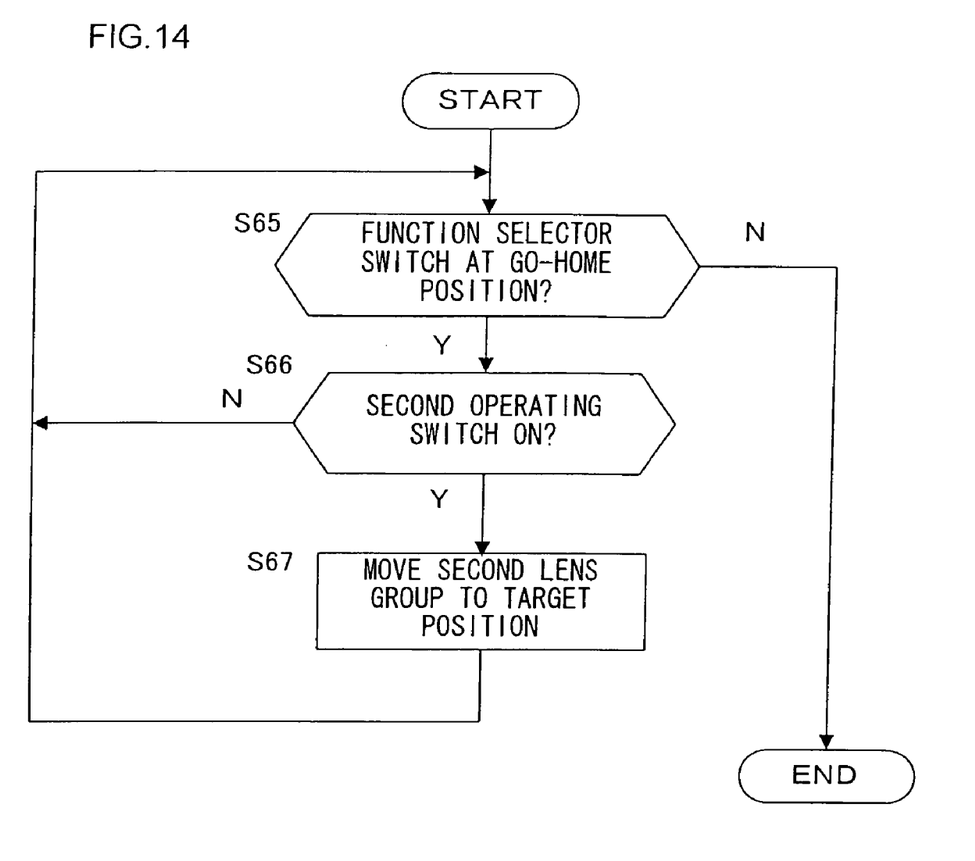
FIG. 14 is a flowchart showing the operational procedure when allocating the go-home function to the second operating switch and performing the go-home operation.

FIGS. 13 and 14 are flowcharts showing the procedure of the go-home control executed in the CPU 21 when the go-home function is allocated in the second operating switch 4. FIG. 13 is a flowchart showing the operation procedure of the focus preset, and FIG. 14 is a flowchart showing the procedure when the go-home control to the focus-preset position is executed.

As shown in FIG. 13, when performing the focus preset of the go-home function, the CPU 21 determines as to whether or not the function selector switch 7 is set to the go-home position (GO HOME) in step S60. Step S61 is proceeded to if the function selector switch 7 is set to the go-home position, whereas this control is ended if the function selector switch 7 is not set to the go-home position. In step S61, it is determined as to whether or not the first operating switch 2 has been turned on. If the first operating switch 2 has been turned on, the procedure proceeds to step S62 in which a position of the second lens group 12 at the current time point is stored in memory (not shown in the drawings) as a target focus position. If, on the other hand, the first operating switch 2 has not been turned on, the procedure returns to step S60.

As shown in FIG. 14, when performing the go-home function, the CPU 21 determines as to whether or not the function selector switch 7 is set to the go-home position in step S65. Step S66 is proceeded to if the function selector switch 7 is set to the go-home position, whereas this control is ended if the function selector switch 7 is not set to the go-home position. In step S66, it is determined as to whether or not the second operating switch 4 has been turned on. If the second operating switch 4 has been turned on, the procedure proceeds to step S67 in which the second lens group 12 is moved to and fixed at the target focus position which has been focus-preset. The procedure returns to step S65 if the second operating switch 4 has not been turned on.

It is possible to perform the focus preset for achieving a state in which a subject at a desired photographic distance is in focus by using the go-home function as described above. Thus, it is possible to reliably focus on a subject if the subject is at the photographic distance having been focus-preset or stored in memory in advance, even if the subject has low contrast and the accurate focusing on such a subject is difficult by the autofocus control.

In the embodiment described above, a switch which is simply turned on and off is utilized as the second operating switch 4. However, the present invention is not to be limited to this example and a two-step switch similar to the shutter release switch 33 for instance may be utilized as the second operating switch 4. For example, it may be arranged that the autofocus control is started at a first step of the second operating switch 4, i.e., when the second operating switch 4 is pressed halfway down, and the go-home function is executed at a second step with the second operating switch 4 being pressed all the way down. In this case, if a subject can not be in focus by the autofocus control executed in response to the second operating switch 4 being pressed halfway down, a focused state which has been focus-preset can be achieved at once by pressing the second operating switch 4 all the way down.

The autofocus control may be started at the first step of the second operating switch 4 which is being pressed halfway down and the focus lock of the autofocus control may be performed at the second step with the second operating switch 4 being pressed all the way down. In this case, although the start of the autofocus control and the focus lock will be instructed through the same switch, it does not confuse the photographer since the operations for instructing the start of the autofocus control and the focus lock are hardly performed at the same time. In a case where the two-step switch is utilized as the second operating switch 4, it is also possible to allocate a function in the second operating switch 4 by the operation of the function selector switch 7.

In the above embodiment, one of the functions of the focus lock for the autofocus control, the start of the autofocus control, and the start of the go-home control is allocated in the second operating switch 4 by the function selector switch 7 as an example. In addition to this, a position for "start" or "terminate" of the vibration correction control may be added to the function selector switch 7 so that a function for instructing to start or terminate the vibration correction control can be allocated to the second operating switch 4. In other words, the function selector switch 7 is a member that selects a function of issuing an operational instruction relating to operations of the camera system to be allocated in the second operating switch 4 among a plurality of operations performed by the camera system, such as the autofocus control, the go-home control and the vibration correction control. A number of the functions among which a function to be allocated in the second operating switch 4 is selected by the operation of the function selector switch 7 is not limited to three as shown in FIG. 5 and may be two or four.

Furthermore, while a focus preset for the go-home function is executed in response to an operation of the first operating switch 2 in the embodiment described above, the present invention is not limited to this example. For instance, the camera system may instead be set up so as to start the vibration correction control or to effect a focus lock in the autofocus control by operating the first operating switch 2. In such a case, too, the operator is allowed to select the function to be assigned to the first operating switch 2 by operating the function selector switch 7. As the function selector switch 7 is operated, the CPU 21 sets the selected function at the first operating switch 2. Namely, the functions to be assigned to the first operating switch 2 and the second operating switches 4 can be individually set with the function selector switch 7.

For instance, the operator can set the first operating switch 2 to function as a focus lock switch in the autofocus control and the second operating switches 4 as a start switch for the autofocus control, by operating the function selector switch 7. In this case, the photographer starts the autofocus control by operating a second operating switch 4 with his left hand and locks the second lens group 12 in the desired focus state by operating the first operating switch 2 with his right hand. Since he can operate the first operating switch 2 while holding the camera body 3 with his right hand as in the embodiment explained above, ease of use is afforded.

It is also possible that the first operating switch 2 is set to be a start switch for the autofocus control and the second operating switch 4 is set to be a focus lock switch for the autofocus control by the operation of the function selector switch 7.

In the embodiment described above, only one focus state achieving a preset focus, i.e., only one go-home target, is set in conjunction with the go-home function. However, the present invention is not limited to this example, and a plurality of focus states may be set as go-home targets instead. In such a case, it is desirable to allocate the different go-home targets each to one of the plurality of second operating switches 4 provided at the interchangeable lens 1.

While the ultrasonic motor 23 is utilized to drive the second lens group 12 in the autofocus control in the embodiment described above, a DC motor may be used instead of the ultrasonic motor 23. In addition, the motor used in the autofocus control may be disposed inside the camera body 3. In such a case, the autofocus control motor inside the camera body 3 and the AF drive mechanism inside the interchangeable lens 1 should be connected with each other via a coupling mechanism of the known art.

Furthermore, while the position of the second lens group 12 is detected with the magnetic encoder 22 in the embodiment, an optical encoder or an electrical position detection device that uses a conductive pattern and a brush may instead be employed.

While an explanation is given above in reference to the embodiment on an example in which the present invention is adopted in an electronic camera that captures a subject image with the CCD 32, the present invention may also be adopted in a similar manner in a silver halide camera. While an explanation is given above in reference to the embodiment on an example in which the interchangeable lens 1 with a long focal length having the tripod mount 6 is used, the present invention may also be adopted in conjunction with an interchangeable lens 1 with a short focal length that does not include a tripod seat.

While four second operating switches 4 are provided along the focus ring 5 in the embodiment described above, the present invention is not limited to this example. For instance, only one second operating switch 4 may be provided near the focus ring 5, or eight second operating switches may be provided along the circumference of the interchangeable lens 1.

While an explanation is given above in reference to the embodiment on an example in which the camera system has the autofocus function, the go-home function and the vibration correction function, the present invention is not limited to this example and it may be adopted in a camera system having at least one of the functions listed above. In addition, the camera system may have another function in addition to those listed above, as long as the first operating switch 2 and the second operating switches 4 can each be set to issue an operational instruction for one of the functions available in the camera system. Moreover, while an image blur caused by hand movement is corrected by moving the fourth lens group 14 within the plane perpendicular to the optical axis L, such an image blur may instead be corrected through image processing executed on the image captured at the CCD 32.

The above described embodiment is an example and various modifications can be made without departing from the spirit and scope of the invention.

What is claimed is:

1. A camera system, comprising:
a camera body;
a lens barrel having a photographing optical system, which can be mounted at the camera body;
a shutter release switch disposed at the camera body and operated to start a shutter release operation;
a focus ring with which a focus match state is manually achieved in the photographing optical system;
a first switch disposed at the lens barrel to conduct an operation of the camera system other than the shutter release operation, the focus ring being disposed at the lens barrel so that the focus ring is positioned between the camera body and the first switch when the lens barrel is mounted at the camera body; and
a mount member disposed at the lens barrel to support the lens barrel, the focus ring being positioned between the mount member and the first switch.

2. A camera system, comprising:
a camera body;
a lens barrel having a photographing optical system, which can be mounted at the camera body;
a shutter release switch disposed at the camera body and operated to start a shutter release operation;
a focus ring with which a focus match state is manually achieved in the photographing optical system;
a first switch disposed at the lens barrel to conduct an operation of the camera system other than the shutter release operation, the focus ring being disposed at the lens barrel so that the focus ring is positioned between the camera body and the first switch when the lens barrel is mounted at the camera body; and
a sensor disposed at the lens barrel to sense a vibration of the lens barrel, the focus ring being positioned between the first switch and the sensor.

3. A camera system according to claim 1, wherein the lens barrel comprises a second switch related to an operation of the camera system other than the shutter release operation, the second switch being disposed at the lens barrel so that the second switch is positioned between the camera body and the focus ring when the lens barrel is mounted at the camera body.

4. A camera system according to claim 1, further comprising a setting selector that selects one of a) an autofocus function, b) a go-home function, and c) a vibration correction function in the camera system for which the first switch issues an operational instruction, the setting selector being positioned between the camera body and the focus ring.

5. A lens barrel that can be mounted at a camera body, comprising:
a photographing optical system;
a focus ring with which a focus-match state is manually achieved in the photographing optical system;
a first switch with which an operational instruction for the photographing optical system is issued, the focus ring being disposed at the lens barrel so that the focus ring is positioned between an image side of the optical system and the first switch; and
a mount member disposed at the lens barrel to support the lens barrel, the focus ring being positioned between the mount member and the first switch.

6. A lens barrel that can be mounted at a camera body, comprising:
a photographing optical system;
a focus ring with which a focus-match state is manually achieved in the photographing optical system;
a first switch with which an operational instruction for the photographing optical system is issued, the focus ring being disposed at the lens barrel so that the focus ring is positioned between an image side of the optical system and the first switch; and
a sensor disposed at the lens barrel to sense a vibration of the lens barrel, the focus ring being positioned between the first switch and the sensor.

7. A lens barrel according to claim 5, wherein the first switch comprises a plurality of switches arranged along the focus ring.

8. A lens barrel according to claim 5, further comprising a setting selector that selects one of a) an autofocus function, b) a go-home function, and c) a vibration correction function in the lens barrel for which the first switch issues an operational instruction, the setting selector being positioned between an image side of the optical system and the focus ring.

9. A lens barrel according to claim 5, further comprising a second switch related to an operation of the lens barrel other than a shutter release operation, the second switch being disposed at the lens barrel so that the second switch is positioned between an image side of the optical system and the focus ring.

10. A camera system according to claim 2, wherein the lens barrel comprises a second switch related to an operation of the camera system other than the shutter release operation, the second switch being disposed at the lens barrel so that the second switch is positioned between the camera body and the focus ring when the lens barrel is mounted at the camera body.

11. A camera system according to claim 2, further comprising a setting selector that selects one of a) an autofocus function, b) a go-home function, and c) a vibration correction function in the camera system for which the first switch issues an operational instruction, the setting selector being positioned between the camera body and the focus ring.

12. A camera system according to claim 1, wherein the first switch comprises a plurality of switches arranged along the focus ring.

13. A camera system according to claim 2, wherein the first switch comprises a plurality of switches arranged along the focus ring.

14. A lens barrel according to claim 6, wherein the first switch comprises a plurality of switches arranged along the focus ring.

15. A lens barrel according to claim 6, further comprising a setting selector that selects one of a) an autofocus function, b) a go-home function, and c) a vibration correction function in the lens barrel for which the first switch issues an operational instruction, the setting selector being positioned between an image side of the optical system and the focus ring.

16. A lens barrel according to claim 6, further comprising a second switch related to an operation of the lens barrel other than a shutter release operation, the second switch being disposed at the lens barrel so that the second switch is positioned between an image side of the optical system and the focus ring.

17. A photographing method using a projection optical system, comprising:
   arranging in the projection optical system a first switch that performs an operation different from a release operation by a shutter release switch;
   arranging a focus ring that manually focuses the projection optical system between the shutter release switch and the first switch; and
   arranging in the projection optical system a mount that holds the projection optical system, wherein the focus ring is positioned between the mount and the first switch.

18. The method as set forth in claim 17, further comprising:
   arranging in the projection optical system a second switch that performs an operation different from the release operation by the shutter release switch,
   wherein the second switch is positioned between the shutter release switch and the focus ring.

19. A photographing method using a projection optical system, comprising:
   arranging in the projection optical system a first switch that performs an operation different from a release operation by a shutter release switch;
   arranging a focus ring that manually focuses the projection optical system between the shutter release switch and the first switch; and
   arranging in the projection optical switch a sensor that detects vibration of the projection optical system, wherein the focus ring is positioned between the sensor and the first switch.

20. The method as set forth in claim 19, further comprising:
   arranging in the projection optical system a second switch that performs an operation different from the release operation by the shutter release switch,
   wherein the second switch is positioned between the shutter release switch and the focus ring.

21. A method of making a projection optical system, comprising:
   arranging in the projection optical system a first switch that supplies an operation instruction regarding the projection optical systems;
   arranging a focus ring that manually focuses the projection optical system between an image side of the projection optical system and the first switch, and
   arranging in the projection optical system a mount that holds the projection optical system, wherein the focus ring is positioned between the mount and the first switch.

22. The method as set forth in claim 21, further comprising:
   arranging in the projection optical system a second switch that performs an operation different from the release operation by the shutter release switch,
   wherein the second switch is positioned between an image side of the projection optical system and the focus ring.

23. A method of making a projection optical system, comprising:
   arranging in the projection optical system a first switch that supplies an operation instruction regarding the projection optical system;
   arranging a focus ring that manually focuses the projection optical system between an image side of the projection optical system and the first switch, and
   arranging in the projection optical system a sensor that detects vibration of the projection optical system, wherein the focus ring is positioned between the sensor and the first switch.

24. The method as set forth in claim 23, further comprising:
   arranging in the projection optical system a second switch that performs an operation different from the release operation by the shutter release switch,
   wherein the second switch is positioned between an image side of the projection optical system and the focus ring.

* * * * *